(12) United States Patent
Davis

(10) Patent No.: US 10,366,627 B2
(45) Date of Patent: Jul. 30, 2019

(54) PORTABLE THREE-DIMENSIONAL DESKTOP CRIME SCENE, AND METHOD OF MANUFACTURING THE SAME

(71) Applicant: Wayne L. Davis, Orland, IN (US)

(72) Inventor: Wayne L. Davis, Orland, IN (US)

( * ) Notice: Subject to any disclaimer, the term of this patent is extended or adjusted under 35 U.S.C. 154(b) by 0 days.

(21) Appl. No.: 15/957,194

(22) Filed: Apr. 19, 2018

(65) Prior Publication Data

US 2018/0247559 A1 Aug. 30, 2018

Related U.S. Application Data

(63) Continuation of application No. 15/155,423, filed on May 16, 2016, now abandoned, and a continuation of application No. 14/968,167, filed on Dec. 14, 2015.

(51) Int. Cl.
*G09B 19/00* (2006.01)
*G09B 1/08* (2006.01)

(52) U.S. Cl.
CPC ............... *G09B 19/00* (2013.01); *G09B 1/08* (2013.01)

(58) Field of Classification Search
None
See application file for complete search history.

(56) References Cited

U.S. PATENT DOCUMENTS 3,613,265 A * 10/1971 Stern et al. ............ G09B 23/36
264/277

OTHER PUBLICATIONS

Sorene, Paul, "Murders in Miniatures: Frances Glessner Lee's Nutshell Studies of Unexplained Death" (1946).*

* cited by examiner

*Primary Examiner* — James B Hull
(74) *Attorney, Agent, or Firm* — Dunlap Bennett & Ludwig PLLC

(57) ABSTRACT

A crime scene learning tool is provided. The crime scene learning tool provides miniature crime scenes and their attendant crime scene objects embedded in a solid transparent medium. Such a crime scene learning tool enables users to analyze and determine relative measurements of the crime scene objects by manipulating the learning tool in three-dimensional, facilitating development of the skills necessary to document real-life crime scenes in accurate and informative police reports.

4 Claims, 3 Drawing Sheets

PORTABLE THREE-DIMENSIONAL DESKTOP CRIME SCENE, AND METHOD OF MANUFACTURING THE SAME

CROSS-REFERENCE TO RELATED APPLICATION

This application is a continuation of U.S. non-provisional application Ser. No. 15/155,423 filed 16 May 2016, and U.S. non-provisional application Ser. No. 14/968,167 filed 14 Dec. 2015, the contents of which are herein incorporated by reference.

BACKGROUND OF THE INVENTION

The present invention relates to criminal science learning apparatuses and, more particularly, to a three-dimensional desktop crime scene hardened in transparent material, making such a tool portable and resilient, and adapted for analysis of relative positioning of crime scene objects for final documentation in a crime report.

Crime scene investigations for students require props that can be huge, costly, difficult to store, and to time consuming to set up as the props involve multiple parts and tend to be bulky. Moreover, space is required to conduct life-size investigations, and such crime scene items consume much storage space. Also, these other methods use loose items that can be lost in transport or during storage. Furthermore, the crime scene learning tools that incorporate dozens of separable police-scene objects engenders an additional disadvantage since all those separable objects must be protected from theft once set up in the field, consuming class time and school resources.

As can be seen, there is a need for a three-dimensional desktop crime scene hardened in transparent material, enabling three-dimensional crime scene analysis, while providing portability and resiliency. The present invention, as a result, is a unitary construction for the end user to inspect and analyze by rotating it into various positions, which will change the relative position of the items in space, thus, providing many different crime scenes with only one product. In other words, the present invention is a self-contained, sealed desk-top miniature crime scene learning tool cast in an acrylic or other transparent material that can be rotated for a user-student can measure and photograph. The present invention can essentially be two-dimensional (thin) or three-dimensional (thick), allowing for many different crimes scenes that can be assessed from many angles without any modification of the product.

SUMMARY OF THE INVENTION

In one aspect of the present invention, a crime scene learning tool includes a plurality of crime scene objects embedded in a solid transparent medium.

In another aspect of the present invention, the crime scene learning tool includes a plurality of crime scene objects embedded in a solid transparent medium, wherein the plurality of crime scene objects includes miniatures of a victim and a weapon; and one or more referential markers embedded in the solid transparent medium, wherein the one or more referential markers include calibrated measuring units.

In yet another aspect of the present invention, a method of learning to document crime scenes in a police report includes providing the above-mentioned crime scene learning tool; and rotating the crime scene learning tool in three-dimensional space so that the one or more referential markers facilitate a determination of relative dimensions and angles between the plurality of crime scene objection.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a crime scene learning tool that embeds crime scenes and their attendant crime scene objects in a solid transparent medium. Such a crime scene learning tool enables users to analyze and determine relative measurements of the crime scene objects by manipulating the learning tool in three-dimensional, facilitating development of the skills necessary to document real-life crime scenes in accurate and informative police reports.

Figure 1:
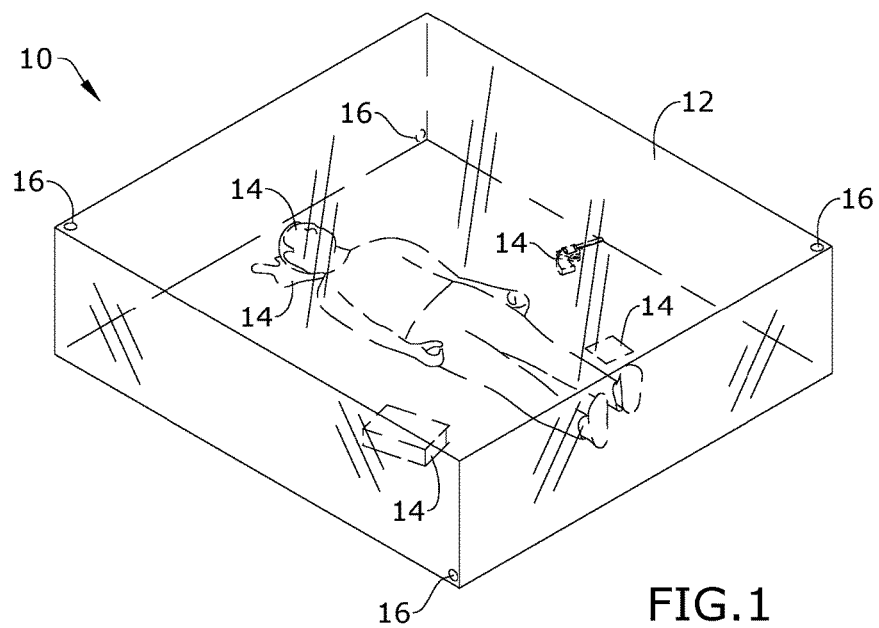
FIG. 1 is a perspective view of an exemplary embodiment of the present invention.
Figure 2:
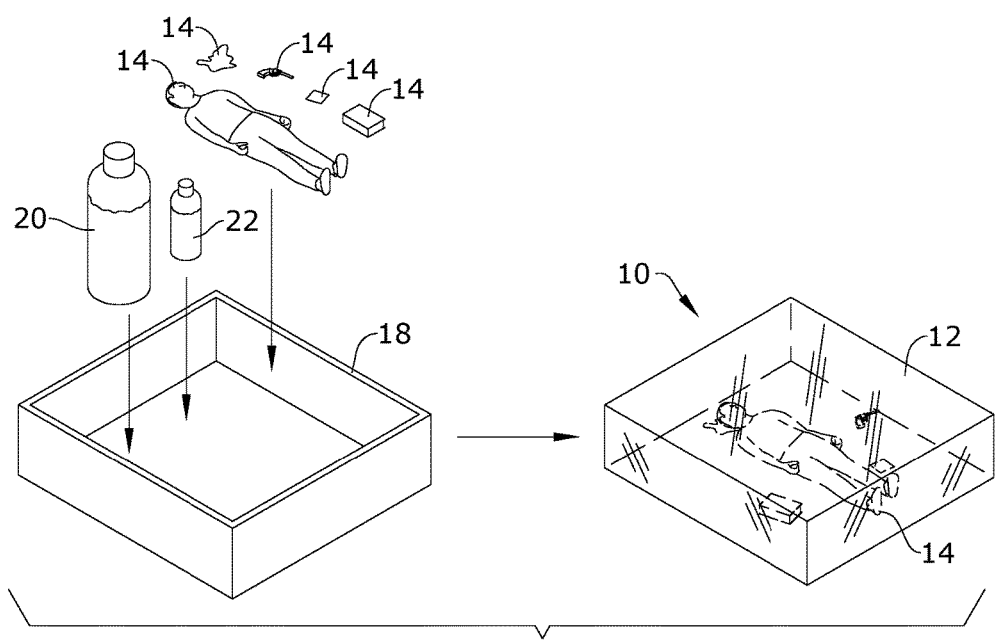
FIG. 2 is a schematic view of an exemplary embodiment of the present invention.
Figure 3:
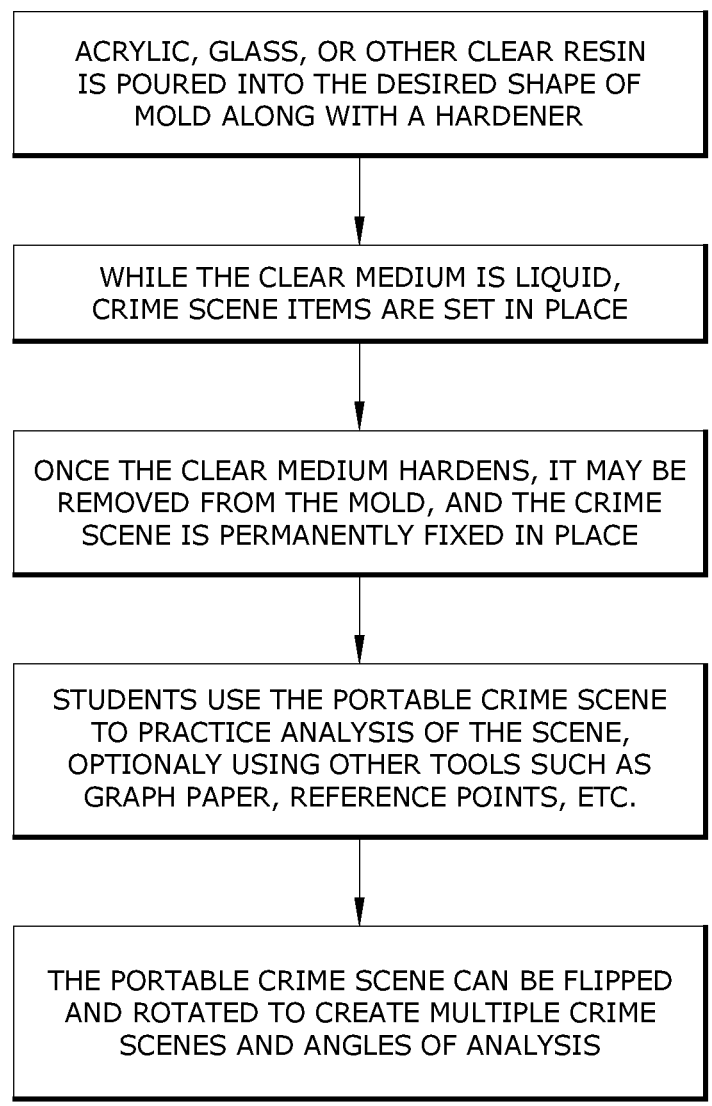
FIG. 3 is a flow chart of an exemplary embodiment of the present invention.

Referring to FIGS. 1 through 6, the present invention may include a transparent embedded crime scene learning tool 10 embodying one or more crime scene objects 14 in a solid transparent medium 12. Each transparent embedded crime scene learning tool 10 may provide a reference marker 16 embedded in and/or attached to, as illustrated in FIG. 1. The reference marker 16 may be a ruler, grid marks, calibrated measuring units (rule), a referential number, or the like. The crime scene objects 14 may include, but not be limited to, home items, rope, people, weapons, tools, and other items that might be found at a crime scene.

Figure 4:
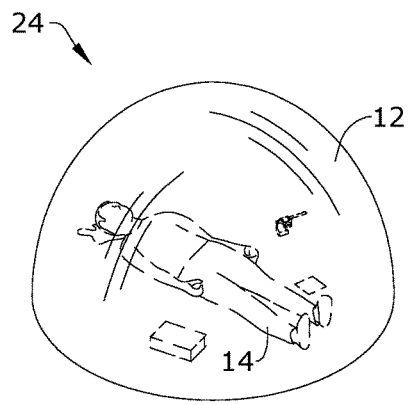
FIG. 4 is a perspective view of an exemplary embodiment of the present invention.
Figure 5:
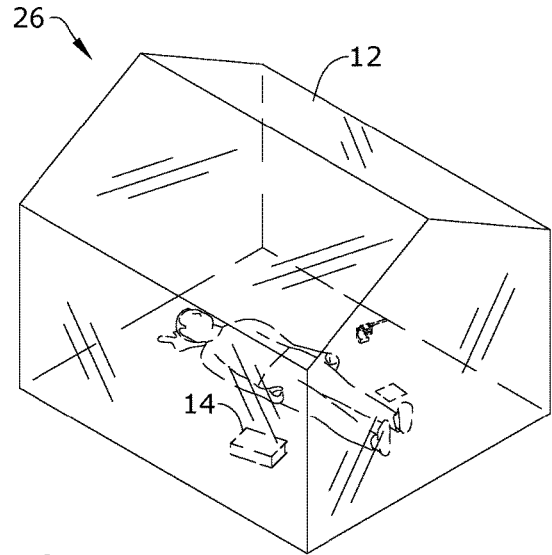
FIG. 5 is a perspective view of an exemplary embodiment of the present invention.
Figure 6:
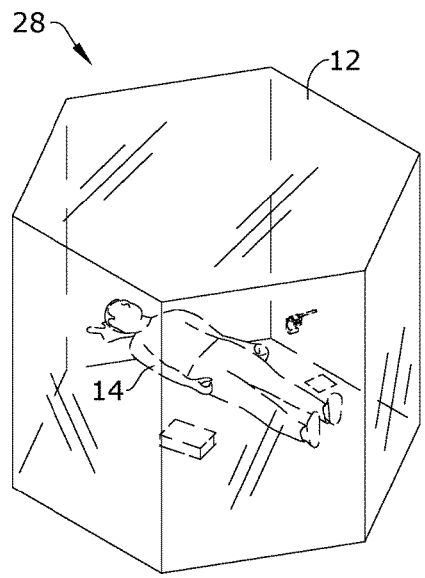
FIG. 6 is a perspective view of an exemplary embodiment of the present invention.

The resulting solid transparent medium 12 may take any geometric shape including, but not limited to, dome-shaped 24, house-shaped 26, hexagonal-shaped 28 as illustrated in FIGS. 4-6. Furthermore, the solid transparent medium 12 may be dimensioned and adapted to any size or shape so long as the solid transparent medium 12 function in accordance with the present invention as described herein. For example, the resultant transparent embedded crime scene learning tool 10 may be the size of a portion or the entire table top.

A method of making the present invention may include the following. An individual may provide fluid casting material 20 adapted to set in a transparent, solidified condition (solid transparent medium) 12. The fluid casting material 20 may be transparent liquid acrylic, resin, glass or the like. The fluid casting material 20 may or may not require a liquid hardener 22 to be added to it. The individual may provide a mold 18 which would define the resulting solid transparent medium 12. The individual may place one or more crime scene objects 14, reference markers 16, other measuring implements (e.g., rulers, graph paper, etc.) in the mold 18. Then the individual may urge the fluid casting material 20 into the mold 18, along with liquid hardener 22, if necessary. Once the fluid casting material 20 has set in the solid transparent condition/medium 12, the individual may remove the mold 18, and utilize the transparent embedded crime scene learning tool 10.

The transparent embedded crime scene learning tool 10 is three-dimensional in that users may rotate the crime scene so as to develop their crime scene analysis skills, including determined measurements and dimensions between various crime scene objects 14 and their relative positions, and determining optimal angles for photographically or otherwise gathering such information.

It is understood that students of crime scene analysis can have a multitude of possible crime scenes readily available that can be used on a desk-top. The product can be flipped and/or rotated to a new position and new measurements will become available. The crime scene objects 14 inside the solid transparent medium 12 can be photographed and measured (from the surface of the product) in order to draw a police report crime scene. It is also possible to measure the distance and height between the three-dimensional crime scene objects 14.

Additionally, the transparent embedded crime scene learning tool 10 can be used for calculations and demonstrations in abstract algebra. As cubes, for example, are flipped and/or rotated, their relative positions to one another changes.

It should be understood, of course, that the foregoing relates to exemplary embodiments of the invention and that modifications may be made without departing from the spirit and scope of the invention as set forth in the following claims.

What is claimed is:

1. A crime scene learning tool comprising: a plurality of crime scene objects embedded in a solid transparent medium, wherein the plurality of crime scene objects includes miniatures of a victim and at least one weapon; and a plurality of non-alphanumeric grid marks embedded in the solid transparent medium, whereby the plurality of grid marks facilitates a determination of relative dimensions and angles between the plurality of crime scene objects; wherein the plurality of non-alphanumeric grid marks embedded in the solid transparent medium comprises an embedded ruler.

2. The crime scene learning tool of claim 1, wherein the plurality of non-alphanumeric grid marks further comprises embedded graph paper.

3. The crime scene learning tool of claim 1, wherein the victim is a miniature of a human being and the weapon is a miniature of a firearm.

4. The crime scene learning tool of claim 1, wherein the plurality of non-alphanumeric grid marks embedded in the solid transparent medium are adjacent to an outer surface of the solid transparent medium, while the victim and the at least one weapon are generally centrally disposed within the solid transparent medium.

* * * * *